United States Patent

Aycock et al.

[11] Patent Number: 5,331,060
[45] Date of Patent: Jul. 19, 1994

[54] PROCESS FOR COMPATIBILIZING POLYPHENYLENE ETHER-POLYAMIDE COMPOSITIONS

[75] Inventors: David F. Aycock, Glenmont; Sai-Pei Ting, Delmar, both of N.Y.

[73] Assignee: General Electric Company, Pittsfield, Mass.

[21] Appl. No.: 21,638

[22] Filed: Feb. 22, 1993

Related U.S. Application Data

[60] Continuation of Ser. No. 635,897, Dec. 28, 1990, abandoned, which is a division of Ser. No. 582,821, Sep. 14, 1990, abandoned, which is a continuation-in-part of Ser. No. 118,130, Nov. 6, 1987, abandoned, which is a continuation of Ser. No. 777,816, Sep. 19, 1985, abandoned.

[51] Int. Cl.⁵ .................. C08L 71/04; C08L 77/00
[52] U.S. Cl. .................... 525/397; 524/409; 524/425; 524/432; 524/433
[58] Field of Search ............. 525/397, 391, 392

[56] References Cited

U.S. PATENT DOCUMENTS

| | | | |
|---|---|---|---|
| 4,614,773 | 9/1986 | Sugio et al. | 525/391 |
| 4,780,505 | 10/1988 | Mashita et al. | 525/66 |
| 4,873,826 | 10/1989 | Gallucci et al. | 525/92 |

*Primary Examiner*—Ana L. Carrillo

[57] ABSTRACT

A single or multi-stage process for providing compatible thermoplastic blends of polyphenylene ether resins and polyamide resins is provided by combining such resins with a compatiblizing amount of an agent having in its molecule both acyl-functionality as well as at least one of the following functional groups: carboxylic acid or acid anhydride, acid amide, imido, carboxylic acid ester, amino or hydroxyl group.

7 Claims, No Drawings

PROCESS FOR COMPATIBILIZING POLYPHENYLENE ETHER-POLYAMIDE COMPOSITIONSCROSS-REFERENCE TO RELATED APPLICATIONS

This is a continuation of Ser. No. 07/635,897 filed on Dec. 28, 1990, now abandoned which is a division of Ser. No. 07/582,821 filed on Sep. 14, 1990, now abandoned, which is a continuation in part of 07/118,130 filed on Nov.6, 1987, now abandoned, which is a continuation of 06/777,816 filed on Sep. 19, 1985 now abandoned.

BACKGROUND OF THE INVENTION AND PRIOR ART

Blends of polyphenylene ether resins and polyamide resins offer desirable properties such as impact strength and chemical resistance and are useful in many thermoplastic applications. Several patents and applications have provided blends of these materials in various proportions. U.S. Pat. No. 3,379,792 by Finholt provided compatible polyphenylene ether-polyamide compositions. Other patents have utilized various compatibilizing agents to improve the properties of the blend.

The co-pending applications mentioned above provide improved polyphenylene ether-polyamide compositions by inclusion of certain effective compatibilizing agents. In Ser. No. 663,745 the inventors discovered a functionalized polyphenylene ether composition which could compatibilize a polyphenylene ether-polyamide composition as shown in the 654,922 application. In a typical example from those patent applications, a polyphenylene ether molecule is functionalized with a compound such as trimellitic anhydride acid chloride (TAAC) which thereby provides a TAAC-functional polyphenylene ether. It was discovered that this TAAC-functional polyphenylene ether was itself a very effective compatibilizer for polyphenylene ether-polyamide blends. It was discovered that the TAAC-functional polyphenylene ether compound could replace all or part of the conventional polyphenylene ether resin in such polyphenylene ether-polyamide compositions.

It has now been discovered that it is possible to bypass the step of separately functionalizing the polyphenylene ether in order to provide an effective compatibilizing agent. The compatibilizing agent (such as trimellitic anhydride acid chloride) can be incorporated directly in a polyphenylene ether-polyamide resin composition and effect useful compatibilization therein under certain conditions. This offers the important advantage of elimination a processing step, thus offering greater flexibility in the manufacturing processes.

DETAILED DESCRIPTION OF THE INVENTION

The present invention relates specifically to a process for providing compatible blends of a polyphenylene ether resin and a polyamide resin by blending a polyphenylene ether resin and polyamide resin with a compatibilizing amount of a compound which contains in its molecule both (i) at least one group having the formula

(I)

where X is F, Cl, Br, I, OH, OR, or

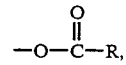

where R is hydrogen or an alkyl or aryl radical; and (ii) at least one carboxylic acid, acid anhydride, acid amide, imido, carboxylic acid ester, amino or hydroxyl group; and wherein groups (i) and two (ii) covalently bonded through an alkyl or aryl linkage. It is not intended, however, that the compatibilizing compound used in the present invention is a polycarboxylic acid. Thus, although group (i) in the compatibilizing compound can be a carboxylic acid group (—COOH), in such case group (ii) would not contain one or more carboxylic acid groups. Rather in such instance group (ii) might preferably be an anhydride group. The converse is also true, if group (ii) of the compatibilizing compound contains one or more carboxylic acid groups, then group (i) would not be —COOH. In this case an acyl chloride group or similar moiety would be preferable. The blending step is preferably accomplished by melt blending in a single or multi-stage extrusion process.

Additionally it may be desirable to neutralize the polymer blend when chemical reactions among the constituent ingredients result in non-neutral by-products. For example, when trimellitic anhydride acid chloride is the compatibilizing compound, a hydrochloric acid by-product may result. This acidic by-product can be readily neutralized with ZnO, CaO, CaCO$_3$, MgO, and Sb$_2$O$_3$, etc. Of course those skilled in the art will be able to utilize a large number of neutralizing agents in the process of the present invention.

The polyphenylene ethers (also known as polyphenylene oxides) useful in the present invention are a well-known class of polymers. They are widely used in industry especially as engineering plastics in applications requiring toughness and heat resistance.

The polyphenylene ethers are characterized by the presence of repeating units of one or more radicals of formula (II)

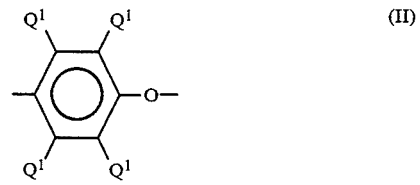
(II)

wherein each Q$^1$ is independently selected from hydrogen, halogen, primary or secondary lower alkyl (i.e. alkyl containing up to seven carbon atoms) phenyl, halo alkyl or amino alkyl wherein at least two carbon atoms separate the halogen or nitrogen atom from the benzene ring, hydrocarbonoxy or halocarbonoxy wherein at least two carbon atoms separate the halogen and oxygen atoms. Examples of suitable primary lower alkyl groups are methyl, ethyl, N-propyl, N-butyl, isobutyl, N-amyl, isoamyl, 2-methylbutyl, N-hexyl, 2,3-dimethyibutyl, 2,3- or 4-methylpentyl and the corresponding heptyl groups. Examples of the secondary lower alkyl groups are isopropyl, sec-butyl and 3-pentyl. Preferably any alkyl radicals are straight chained rather than branched. Most often each Q$^1$ is alkyl or phenyl especially those alkyl groups having 1–carbon atoms.

Suitable polyphenylene ethers include both homopolymers and copolymers. Suitable homopolymers are those containing, for example, 2,6-dimethyl-4-phenylene ether units. Suitable copolymers include random copolymers containing a combination of phenylene ether units such as the aforementioned units in combination with, for example, 2,3,6-trimethyl-1,4-phenylene ether units. Many suitable random copolymers as well as homopolymers are described in the patent literature.

As has been described in the patent literature, the polyphenylene ethers may also contain various other moieties which are incorporated for the purpose of modifying properties, such as molecular weight, impact strength and melt viscosity. For example, a vinyl monomer like acrylonitrile or styrene, or a polymer like polystyrene, may be grafted in a known manner onto poly(2,6-dimethyl-1,4-phenylene ether). A lower molecular weight hydroxy-terminated polyphenylene ether may be reacted with a coupling agent, such as a low molecular weight polycarbonate, a quinone or a formal, to form a higher molecular weight polyphenylene ether, the obtained coupled polymer containing the reaction product of the hydroxy groups and the coupling agent.

Thus, the polyphenylene ethers useful in the invention are homopolymers and copolymers composed of one or more repeating units of formula II, and, optionally, residues of various modifiers. The typical molecular weight (number average molecular weight, as determined by gel permeation chromatography) is within the range of 5,000 to 40,000, corresponding to an intrinsic viscosity range of approximately 0.40 to 0.50 dl/g, as measured in chloroform at 25° C. The intrinsic viscosity is maintained at about 0.45 to 0.50 dl/g for most uses.

The polyphenylene ethers are typically prepared by the oxidative coupling of at least one corresponding monohydroxyaromatic compound. A particularly useful and readily available monohydroxyaromatic compound is 2,6-xylenol, whereupon the polymer may be characterized as a poly(2,6-dimethyl-1,4-phenylene ether). Another monohydroxyaromatic compound is 2,3,6-mesitol.

A variety of catalyst systems are known for the preparation of polyphenylene ethers. For the most part, they contain at least one heavy metal compound such as copper, manganese or cobalt compound, usually in combination with various other materials.

A first class of preferred catalyst systems consist of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class of catalysts. They are generally alkaline systems in which divalent manganese is combined with such anions as a halide, alkoxide or phenoxide. Most often, the manganese is present as a complex with one or more complexing and/or chelating agents such as dialkylamines, alkanolamines, alkylenediamines, o-hydroxyaromatic alkdehydes, o-hydroxyazo compounds, w-hydroxyoximes (mononeric and polymeric), o-hydroxyaryl oximes and B-diketones. Also useful are cobalt-containing catalyst systems. Many patents and publications disclose manganese and cobalt-containing catalyst systems for polyphenylene ether preparation.

Particularly useful polyphenylene ethers for the purpose of this inventions are those which comprise molecules having at least one aminoalkyl-substituted end group or bisphenyl end group.

Polymers containing the aminoalkyl-substituted end groups may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the alpha-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate, with numerous beneficial effects often including an increase in impact strength and compatibilization with other blend components. Reference is made to U.S. Pat. Nos. 4,054,553; 4,092,294; 4,477,651 and 4,517,341.

Polymers with bisphenyl end groups are typically obtained from reaction mixtures in which a by-product diphenoquinone is present, especially in a copper-halide-secondary or tertiary amine system. In this regard, the disclosures of U.S. Pat. Nos. 4,234,706, 4,477,649 and 4,482,697 are particularly pertinent. In mixtures of this type, the diphenoquione is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both aminoalkyl-substituted end groups and bisphenyl end groups.

It should be understood, however, that other end groups may be present and that the invention in its broadest sense may not be dependent on the molecular structures of the polyphenylene ether end groups.

Polyamides suitable for the preparation of the compositions for the present inventions may be obtained by polymerizing a monoamino-monocarboxylic acid or a lactam thereof having at least 2 carbon atoms between the amino and carboxylic acid group; or by polymerizing substantially equimolar proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and a dicarboxylic acid. The dicarboxylic acid may be used in the form of a functional derivative thereof, for example an ester or acid chloride. The patent literature contains many examples of suitable polyamides and processes for providing them.

The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO —NH-group in the case of a lactam. As particular examples of aminocarboxylic acids and lactams there may be mentioned E-aminocaproic acid, butyrolactam, povalolactam, caprolactam, capryl-lactam, enantholactam, undencanolactam, dodecanolactam and 3- and 4-aminobenzoic acids.

Diamines suitable for use in the preparation of the polyamides include the straight chain and branched, alkyl, aryl and alkyl-aryl diamines. Such diamines include, for example, those represented by the general formula:

$$H_2N(CH_2)_nNH_2$$

wherein n is an integer of from 2 to 16, such as trimethylenediamine, tetramethylenediamine, pentamethylenediamine, octamethylenediamine and especially hexamethylenediamine, as well as trimethyl hexamethylene diamine, meta-phenylene diamine, meta-xylene diamine and the like.

The dicarboxylic acids may be aromatic, for example isophthalic and terephthalic acids. Preferred dicarboxylic acids are of the formula

HOOC—Y—COOH wherein Y represents a divalent aliphatic group containing at least 2 carbon atoms, and examples of such acids are sebacic acid, octadecanedoic acid, suberic acid, glutaric acid, pimelic acid and adipic acid.

Typical examples of the polyamides or nylons, as these are often called, include for example polyamides 6,6/6, 11, 12, 6/3, 6/4, 6/10 and 6/12 as well as polyamides resulting from terephthalic acid and/or isophthalic acid and trimethyl hexamethylene diamine, polyamides resulting from adipic acid and meta xylylenediamines, polyamides resulting from adipic acid, azelaic acid and 2,2-bis-(p-aminocyclohexyl)propane and polyamides resulting from terephthalic acid and 4,4'-diamino-dicyclohexylmethane. Mixtures and/or copolymers of two or more of the foregoing polyamides or prepolymers thereof, respectively, are also within the scope of the present invention. Preferred polyamides are the polyamides 6, 6/6, 11 and 12, most preferably polyamide 6/6.

It is also to be understood that the use of the term "polyamides" herein and in the appended claims is intended to include the toughened or super tough polyamides. Super tough polyamides, or super tough nylons, as they are more commonly known, are available commercially, e.g. from E.I. DuPont under the tradename Zytel ST, or may be prepared in accordance with a number of U.S. Patents including, among others, Epstein U.S. Pat. No. 4,174,358; Novak 4,474,927; Roura U.S. Pat. No. 4,346,194; and Joffrion U.S. Pat. No. 4,251,644, herein incorporated by reference. These super tough nylons are prepared by blending one or more polyamides with one or more polymeric or copolymeric elastomeric toughening agents. Suitable toughening agents are disclosed in the above-indentified U.S. Patents as well as in Caywood, Jr. U.S. Pat. No. 3,884,882 and Swiger, U.S. Pat. No. 4,147,840 and Gallucci et al., "Preparation and Reactions of Epoxy-Modified Polyethylene" J. APPL. POLY. SCI., V. 27, pp. 425–437 (1982) herein incorporated by reference. Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

The blending ratio of polyphenylene ether to polyamide is 5 to 95% by wt. preferably 30 to 70% by wt. of the former to 95 to 5% by wt., preferably 70 to 30% by wt. of the latter. When the polyamide is less than 5 wt. percent, its effect to improve solvent resistance is small, while when it exceeds 95 wt. percent, thermal properties such as heat distortion temperature tend to become poor.

The compatibilizing molecule can be generalized as containing an acyl-functional group depicted by formula III:

$$\begin{array}{c} \text{O} \\ \parallel \\ \text{X}-\text{C}- \end{array} \qquad (III)$$

where X is F, CL, BR, I, OH, OR,

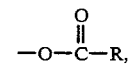

$$\begin{array}{c} \text{O} \\ \parallel \\ -\text{O}-\text{C}-\text{R}, \end{array}$$

etc. and where R is H or an aliphatic or aromatic radical having less than about 10 carbon atoms. The moiety of formula III is covalently bonded through an alkyl or aryl linkage to a group which is primarily responsible for associating or bonding with the polyamide portion of the thermoplastic composition. In the preferred embodiment discussed above, this group is an arthydride group but can be generalized by formula IV:

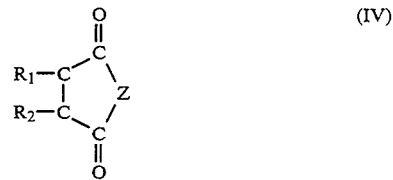

(IV)

Where $R_1$, and $R_2$ are each, independently, H or an aliphatic or aromatic radical (having, preferably, less than about 10 carbon atoms), and where at least one of $R_1$ or $R_2$ provides the covalent linkage to the moiety of formula III. In formula IV, Z is O, or N-, etc. are described below. As discussed above, groups (i) and (ii) would not simultaneously be —COOH groups. It is well known that polyamides will react or associate with a very large number of molecules containing groups chosen from among carboxylic acid (including mono- and poly-acids), acid anhydride, acid amide, imido, carboxylic acid ester, amino or hydroxyl groups.

Examples of suitable compatibilizing materials falling within the scope of the invention include but are not limited to the following compounds:

chloroethylanoylsuccinic anhydride, trimellitic anhydride acid chloride, chloroformylsuccinic anhydride, and 1-acetoxyacetyl-3,4-dibenzoic acid anhydride.

Of course, compatibilizing compounds effective in this invention are not limited to the preferred anhydride species mentioned above. A further example is terephthalic acid acid chloride.

The amount of the compatibilizing compound to be used is that amount which manifests property improvement, especially improved compatibility as well as improved processability, impact strength and/or elongation, in the polyphenylene ether-polyamide compositions. In general, the amount of compatibilizer precursor used to react with polyphenylene ether will be up to about 6%, preferably from about 0.05 to about 4% by weight based on the polyphenylene ether. The specific amount of the compatibilizer to be used to achieve optimum results for a given composition is dependent, in part, on the specific compatibilizer precursor, the specific polyphenylene ether and polyamide to be compatibilized and the weight ratio of said polymers and the processing conditions. A variety of suitable combinations can be achieved without undue experimentation.

In addition to the improved processability, impact strength and elongation, many of the compositions prepared in accordance with the present invention manifest improvements in other physical properties and characteristics including for example, reduced water absorption.

The above-mentioned property improving compatibilizer compound may be used alone or in combination with a primary or secondary amine. The presence of the amine may enhance the improvement of certain physical properties when used in combination with various compatibilizers. Suitable amines include those primary and secondary amines having from 1 to about 20, preferably from 1 to about 10 carbon atoms. Examples of said suitable amines are, methyl ethylamine, diethylamine, butylamine, dibutylamine, analine, n-octadecylamine and the like. The amount of the primary or secondary amine to be used is generally up to about 3% by weight, preferably up to about 1% by weight.

The process of the present invention can be accomplished by several methods including single or multi-stage extrusion processes. In a single-stage process all of the requisite ingredients are initially combined together and are compounded in the extrusion process until a sufficiently homogeneous product is formed. Optional ingredients such as reinforcing or extending fillers, flame retarding additives, impact modifiers, stabilizers and pigments can be conventionally employed. The following examples demonstrate that useful products may also be obtained in a multi-stage process wherein several of the components of the final product are precompounded prior to formation of the final product. There may be several advantages to utilizing such a multi-stage process, including ease of processing, ease of handling certain components, as well as the flexibility to provide polyphenylene ether-polyamide products having a variety of desirable properties. Those skilled in the art will be able to adjust the processing conditions in order to provide a range of useful products.

It is preferred that the single or multi-stage process described above take place in an extruder as is customary in the thermoplastics manufacturing industry. Typically such an extruder will be of the single or double screw type and will exhibit a range of through put rates, temperature profiles and shear rates.

Typically the present process will operate at a melt temperature of approximately 400° to 600° F.

The following examples describing single and double stage processes for practicing the present invention are not limiting in any way. All parts are by weight unless otherwise specified. All of the foregoing patents and applications are hereby incorporated by reference.

EXAMPLES 1–5

Table 1 indicates the composition of several samples falling within the scope of the present invention. In a one-stage process, the ingredients were compounded on a 28 mm Werner Pfleiderer twin screw extruder at, approximately, 290 rpm and temperatures ranging from 450° to 550° F. Compounded samples were injection molded on a 3 ounce Newbury injection molding machine having a barrel set temperature of 550° F., a mold temperature of 150° F. and an injection pressure of 10,000 psi.

TABLE 1

| Sample No. | Control | 1 | 2 | 3 | 4 | 5 |
| --- | --- | --- | --- | --- | --- | --- |
| Poly (2,6-dimethyl-1,4-phenylene) ether[a] | 49 pbw | 49 | 49 | 49 | 49 | 49 |
| Polyamide 6,6[b] | 41 | 41 | 41 | 41 | 41 | 41 |
| Impact Modifier[c] | 10 | 10 | 10 | 10 | 10 | 10 |
| TAAC[d] | — | 0.123 | 0.245 | 0.49 | 0.98 | 1.96 |
| ZnO (mole ratio of ZnO/TAAC is 2/1) | — | 0.048 | 0.093 | 0.186 | 0.372 | 0.744 |
| Properties | | | | | | |
| Heat Distortion Temp (°F.) @ 66 psi | 361 | 358 | 356 | 361 | 367 | 370 |
| Izod Impact (ft-lb/in. Notched) | 1.0 | 1.5 | 2.8 | 2.8 | 2.8 | 1.1 |
| Dynatup Impact (in-lb.) | 7 | 26 | 445 | 437 | 412 | 17 |
| Tensile Strength at Yield (psi) | 9000 | 9300 | 9300 | 9300 | 8600 | 8100 |
| Tensile Strength at Break (psi) | 9000 | 8700 | 8200 | 8200 | 8300 | 8100 |
| Tensile Elongation (%) | 10 | 24 | 77 | 78 | 94 | 16 |
| Melt Viscosity (poise) at 282° C. | | | | | | |
| a) 100 sec$^{-1}$ | 6370 | 8629 | 6413 | 4720 | 2040 | 3355 |
| b) 1500 sec$^{-1}$ | 1467 | 1172 | 1257 | 1076 | 624 | 218 |

Notes for Table 1:
[a]PPO resin, General Electric Company
[b]Zytel 101, a basic Nylon 6,6 resin obtained from DuPont.
[c]Stereon-840A, a multi-block styrene-butadiene copolymer, obtained from Firestone.
[d]TAAC is Trimellitic Anhydride Acid Chloride

EXAMPLE 6

Example 6 demonstrates a two-stage extrusion process for practicing the present invention. The polyphenylene ether, TAAC and ZnO were precompounded on a one inch Wyne single-screw extruder at temperatures ranging from about 520°–600° F. This compounded mixture was then extruded with polyamide 6,6 and the impact modifier on a 28 mm twin-screw extruder at the same conditions as Examples 1–5. The resin composition extruded by this two-stage process was molded under the same conditions as Examples 1–5. Composition and physical properties for Example 6 are shown in Table 2:

TABLE 2

| Sample No. | 6 pbw |
|---|---|
| Polyphenylene ether | 49 |
| Polyamide 6,6 | 41 |
| Impact modifier | 10 |
| TAAC | 0.49 |
| ZnO (mole ratio of ZnO/TAAC is 2/1) | 0.186 |
| Properties | |
| Heat Distortion Temp (°F.) @ 66 psi | 368 |
| Izod Impact (ft-lb/in.N) | 2.1 |
| Dynatup Impact (in-lb) | 164 |
| Tensile Strength at Yield (psi) | 8400 |
| Tensile Strength at Break (psi) | 7900 |
| Tensile Elongation (%) | 48 |
| Melt Viscosity (poise) at 282° C. | |
| a) 100 sec$^{-1}$ | 3010 |
| b) 1500 sec$^{-1}$ | 858 |

We claim:

1. A process for providing compatible blends of a polyphenylene ether resin and a polyamide resin, comprising the steps of:
   a) melt-blending a polyphenylene ether resin and a polyamide resin with an effective compatibilizing amount of a compatibilizing compound which contains in its molecule both
      (i) at least one group having the formula

wherein X is F, Cl, Br, I, OR, or

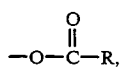

wherein R is H or an alkyl or aryl radical; and
      (ii) at least one carboxylic acid, acid anhydride, acid amide, imido, carboxylic acid ester, amino, or hydroxyl group; and
   wherein groups (i) and (ii) are covalently bonded through an aryl linkage, and are not simultaneously a COOH group; and b) neutralizing the blend.

2. The process of claim 1, wherein the blend is neutralized with a compound selected from the group consisting of ZnO, CaO, CaCO$_3$, MgO, and Sb$_2$O$_3$.

3. The process of claim 1, wherein the compatibilizing compound is selected from the group consisting of trimellitic anhydride acid chloride, terephthalic acid acid chloride, and 1-acetoxyacetyl-3,4-dibenzoic acid anhydride.

4. The process of claim 1, wherein the melt-blending is accomplished in an extruder.

5. The process of claim 1, wherein the polyphenylene ether is prepared by the oxidative coupling of at least one corresponding monohydroxyaromatic compound selected from the group consisting of 2,6-xylenol; 2,3,6-mesitol.

6. The process of claim 1, wherein the polyamide resin is selected from the group consisting of polyamide 6; polyamide 6,6; polyamide 11; polyamide 12; polyamide 6,3; polyamide 6,4; polyamide 6,10; polyamide 6,12; and mixtures of any of the foregoing.

7. A process for providing compatible blends of a polyphenylene ether resin and a polyamide resin, comprising the steps of:
   (a) melt-blending a polyphenylene ether resin and a polyamide resin with an effective compatibilizing amount of a compatibilizing compound which contains in its molecule both
      (i) at least one group having the formula

wherein X is F, Cl, Br, I, OR, or

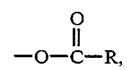

wherein R is H;
      (ii) at least one carboxylic acid, acid anhydride, acid amide, imido, amino, or hydroxyl group; and wherein groups (i) and (ii) are covalently bonded through an aryl linkage, and are not simultaneously a COOH group; and
   (b) neutralizing the blend.

* * * * *